INVENTOR.
WILLIAM B. ZELINA
BY
HIS ATTORNEY

United States Patent Office 3,539,908
Patented Nov. 10, 1970

3,539,908
INSTRUMENT-TYPE TRANSFORMER ARRANGEMENT FOR TRANSFORMING BOTH POLARITIES OF A UNIDIRECTIONAL CURRENT
William B. Zelina, Erie, Pa., assignor to General Systems, Inc., Erie, Pa., a corporation of Pennsylvania
Filed May 20, 1968, Ser. No. 730,542
Int. Cl. G05f 3/06; G01r 33/02
U.S. Cl. 323—48                                                    12 Claims

ABSTRACT OF THE DISCLOSURE

A unidirectional current transformer arrangement for transforming unidirectional current of both polarities. A magnetic core inductively coupled with a unidirectional current to be transformed, is connected in feed-back coupling relation with a pair of transistor devices tending to establish opposing conducting conditions. A diode is connected across a pair of electrodes of each of the transistor devices so that for a given polarity of the unidirectional current to be transformed one transistor device is maintained nonconducting while the other transistor device is transferred between conducting and non-conducting conditions in accordance with the occurence of opposite sense flux changes in the core means. Flux change in one sense is due to ampere-turns supplied by the unidirectional current to be transformed and in the opposite sense due to ampere-turns supplied by current from a unidirectional voltage source connected with the transistors. Thus a pair of output terminals are energized to produce an output which is proportional to the magnitude of the unidirectional current which was inductively coupled to the core means and with the polarity of such output indicative of the polarity of the unidirectional current to be transformed.

This invention relates generally to arrangements for transforming unidirectional currents and more particularly to such an arrangement requiring a single magnetic core means and which is capable of transformig both polarities of such unidirectional current and unambiguously indicating such polarity as well.

In my Pat. No. 3,396,338 there is disclosed and claimed an arrangement for transforming unidirectional current wherein the unidirectional current to be transformed is magnetically coupled to a core means and current from a unidirectional voltage source is similarly coupled to the core by means of a winding and a switch means so that during one portion of a cycle of operation, when the switch means is effectively open, energization of a load means in series with the winding is effected by the voltage induced in the winding by the unidirectional current to be transformed, and during the other portion of the cycle, when the switch means is effectively closed, energization of the load means is effected from the unidirectional voltage source and wherein the transfer of the switch means between its open and closed conditions is determined by the occurrence of opposite sense flux changes in the core means.

The present invention is related to that of the foregoing patent in that it also utilizes the basic mode of operation of that invention, namely, energization of a load during one portion of a cycle of operation by pure transformer action and energization of such load during the other portion of the cycle from a unidirectional voltage source until an equal and opposite sense flux change has taken place in the core.

The present invention implements this concept into a new and improved arrangement which not only provides for the transformation of unidirectional current of either polarity but provides a clear and unambiguous indication of such polarity. This is a very important feature since there are many application wherein it is necessary to be able to sense a unidirectional current and to know its polarity and also to know unambiguously when, or if, the polarity of such current has reversed.

It is a primary object of this invention to provide a new and improved arrangement which is capable of transforming unidirectional currents of both polarities and providing an unambiguous indication of just what that polarity is.

The novel features believed characteristic of the invention are set forth with particularity in the appended claims. The invention itself, however, both as to its organization and method of operation, together with further object and advantages thereof, may best be understood by reference to the following description taken in conjunction with the following drawing in which:

Figure 1:
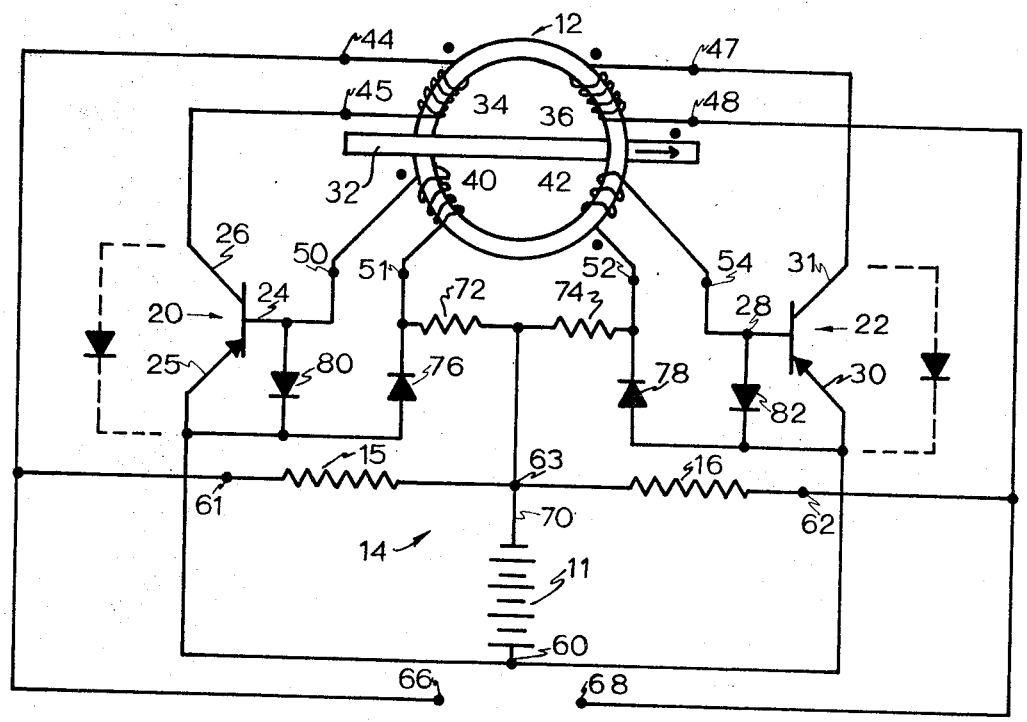
FIG. 1 is a schematic circuit diagram of a bi-polar unidirectional current transforming arrangement in accordance with one embodiment of this invention.

Referring now to the drawing, there is shown a unidirectional current transforming arrangement in accordance with an embodiment of this invention. As shown, the unidirectional current transforming arrangement comprises a unidirectional voltage source 11, a core means 12, a load means 14, having two equal portions 15 and 16, and a pair of transistor switch means 20 and 22, each having base, emitter and collector electrodes. For example, transistor switch means 20 has a base electrode 24, an emitter electrode 25 and a collector electrode 26 while transistor switch means 22 has a base electrode 28, emitter electrode 30 and collector electrode 31. Saturating core means 12 is adapted to be inductively coupled with a unidirectional current to be transformed, such as for example current in a conductor of an external circuit the magnitude of which is to be sensed, transformed to a different magnitude or utilized in some desired manner. For simplicity, this unidirectional current to be transformed is illustrated as flowing in bus 32 which may be the conductor of the external circuit. Alternatively, the core means 12 may be provided with a winding adapted to be connected in series with the unidirectional current to be transformed.

Accordingly, it will be understood by those skilled in the art that core means 12 may be a split core, so as to be fitted about the current carrying conductor 32, may have a single or multi-turn winding disposed thereon, or arranged in any other suitable manner so as to be magnetically coupled with the unidirectional current to be transformed.

Winding 34 has a pair of terminals 44 and 45, winding 36 a pair of terminals 47 and 48, winding 40 a pair of terminals 50 and 51 and winding 42 a pair of terminals 52 and 54. The terminals 45 and 47 of windings 34 and 36 are connected respectively to the collector electrodes 26 and 31 of the transistor switch means 20 and 22, the emitter electrodes 25 and 30 of which are connected in common to the positive terminal 60 of the voltage source 11. The terminals 44 and 48 of windings 34 and 36 are connected respectively to the terminals 61 and 62 of the load means 14 to which output terminals 66 and 68 are also connected. The junction 63 between load portions 15 and 16 is connected to the negative terminal 70 of voltage source 11.

The terminals 50 and 54 of the windings 40 and 42 are connected, respectively, to the base electrodes 24 and 28 of transistor switch means 20 and 22; terminals 51 and 52 of windings 40 and 42 being connected through respective resistances 72 and 74 to the negative terminal 70 of voltage source 11 via junction 63. A diode 76 is connected between emitter electrode 25 of transistor switch means 20 and the terminal 51 of winding 40 and, in combination with resistance 72, provides a turn on bias for switch means 20. Similarly, a diode 78 is connected between emitter electrode 30 of transistor switch means 22 and the terminal 52 of winding 42 to provide, in combination with resistance 74, a turn on bias for switch means 22.

First and second asymmetrically conducting devices 80 and 82, shown as semiconductor diodes, are provided to establish current paths to allow the respective portions 15 and 16 of load means 14 to be energized from the voltage induced in the respective windings 34 or 36 due to the current flowing in bus 32 (which is the unidirectional current to be transformed). Diodes 80 and 82 are therefore connected across a pair of electrodes of the transistor switch means 20 and 22 and function to establish the desired current path as well as to reverse bias the respective transistor switch means.

To this end, diode 80 may be connected, as shown, between the base electrode 24 and the emitter electrode 25 of transistor switch 20 and diode 82 connected between the base electrode 28 and emitter electrode 30 of transistor switch 22. Alternatively, the diodes may be connected, as shown by the broken lines, between the collector and emitter electrodes of the respective transistor switch means 20 and 22.

The conventional dot notation is used in the drawing to show the sense of the magnetic linkage of the various windings on the core. For example, positive (conventional) current flow into a dot marked terminal of a winding causes a voltage to be induced in each of the other windings linked to the core in a direction to make the dot marked terminal of any other winding positive with respect to the unmarked terminal of that other winding. Also, current into a dot marked terminal will supply positive ampere-turns to the core while current out of a dot marked terminal will supply negative ampere-turns to the core.

In operation, assume initially that the unidirectional current to be transformed has a polarity as shown by the arrow. That is, current flows out of the dot marked terminal of bus 32. This polarity of current applies negative ampere-turns to core means 12 causing the flux to be driven toward negative saturation. Also, this polarity of unidirectional current in bus 32 causes voltages to be induced in each of the other windings to make their dot marked terminals negative with respect to their unmarked terminals.

Accordingly, winding 42 is operative to apply a voltage to transistor switch means 22 of a polarity to make the base electrode 28 thereof positive with respect to the emitter electrode 30 thereby causing such transistor to be turned off. Also, winding 40 applies a voltage to transistor switch means 20 of a polarity tending to make base electrode 24 negative with respect to emitter electrode 25.

A voltage is also induced in winding 34 and this voltage causes current to flow from terminal 45, through the collector to base of transistor switch means 20, through the current path provided by diode 80, through voltage source 11 and through portion 15 of the load means to terminal 44 of winding 34 thereby energizing load portion 15 in a direction to make terminal 61 negative with respect to junction 63. The current flow just described also operates to reverse-bias transistor switch means 20 to such an extent that the voltage from winding 40 is incapable of causing such transistor switch means to be turned on.

Although there is a voltage induced in winding 36 with a polarity making terminal 48 positive with respect to terminal 47, there is no path for such current to flow since transistor switch means 22 is nonconducting and diode 82 is poled to block current flow of such polarity.

This operation continues only until core means 12 reaches negative saturation at which time the flux collapses and reverses causing a voltage to be induced in windings 40 and 42 to very quickly apply voltages to the transistor 20 and 22 of a polarity tending to cause transistor 20 to be biased off and transistor 22 to be biased on.

When transistor switch means 22 switches on, current flows from terminal 60 of voltage source 11, the emitter-collector circuit of transistor switch 22, winding 36 and portion 16 of the load means to terminal 70 of voltage source 11. Thus, load portion 16 is energized in a direction to make the terminal 62 positive with respect to the junction 63. Since, as previously described, terminal 61 is negative with respect to junction 63, output terminal 68 is positive with respect to output terminal 66 for the polarity of the unidirectional current assumed—that is, current flowing out of the dot marked terminal of bus 32.

As just described, when transistor switch means 22 is switched on the current flow from voltage source 11 is into the dot marked terminal of winding 36 thereby applying positive ampere-turns to core means 12 and driving the flux toward positive saturation, that is, in a direction opposite that due to the current in bus 32. Load portion 16, therefore, will be energized in this manner until core means 12 reaches positive saturation when the collapse and reversal of flux therein causes transistor switch means 22 to be switched off and load portion 15 to be again energized from the voltage induced in winding 34 due to the current in bus 32.

From the foregoing description it can be seen that, for the polarity of current shown, during one portion of the cycle of operation—termed herein the "CT Portion"—load portion 15 is energized as a result of the voltage induced in winding 34 due to the current in bus 32 and during the other portion of the cycle of operation—termed herein the "CMR Portion"—load portion 16 is energized through transistor switch means 22 from the voltage of source 11. Moreover, load portions 15 and 16 are energized in such a direction that one output terminal (68) is made positive with respect to the other terminal (66) for the complete cycle of operation. The output at terminals 66 and 68, therefore, is proportional to the current in bus 32.

For example, during the CT portion of the cycle of operation, and applying straightforward transformer theory, the voltage induced in winding 34 will be proportional to the current in bus 32. Also, since load portion 15 is caused to be energized from this induced voltage, the voltage developed across load portion 15 is proportional to the current in bus 32. Once core means 12 reaches negative saturation (for the polarity of current assumed) there will be no more flux change and hence no further voltage induced in core means 12. When this occurs, however, transistor switch means 22 switches on causing current to flow through load portion 16 and winding 36 from voltage source 11 to supply ampere-turns to the core in a direction to drive core means 12 toward positive saturation. Thus, the switching on of transistor switch means 22 begins the CMR portion of the cycle of operation.

If the total output at terminals 66 and 68 is to be proportional to the current in bus 32, then during this CMR portion of the cycle load portion 16 must be energized an amount equal to that of load portion 15. This is accomplished by causing load portion 16 to be energized from voltage source 11 until the current in winding 36 supplies ampere-turns to the core means 12 which are equal to and opposite the ampere-turns supplied to core a direction to drive core means 12 toward positive saturating reactor theory (and neglecting exciting current) it will be seen that no flux will change in core means 12 to limit the current in load portion 16 until the current in winding 36 supplies ampere-turns to core means 12 equal to the ampere-turns supplied thereto by the current in bus 23.

Figure 2:
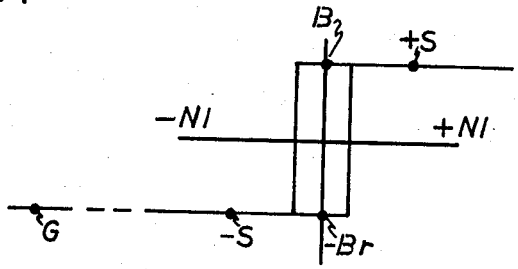
FIG. 2 is an idealized hysteresis characteristic of a core constructed of rectangular hysteresis loop material.

This may best be described in connection with the magnetic hysteresis loop characteristic shown in FIG. 2. For the polarity of current assumed in bus 32, ampere-turns will have been supplied to core means 12 to drive the flux in such core means way out into the negative saturation region—to the region shown at point G, for example, in FIG. 2. That is, current in bus 32 supplied a number of negative ampere-turns to the core means 12. Until the current in winding 36 supplied positive ampere-turns to drive the flux in core means 12 from its point in the negative saturation region and out to about the point $-B_R$, there is essentially no flux change in such core. The number of positive ampere-turns required to drive the flux in the core from the point $-B_R$ in FIG. 2 to positive saturation $+S$ is the same as the number of negative ampere-turns required to drive the flux in the core from the point $+B_R$ to negative saturation $-S$.

As shown, the transfer energization of load portion 15 by the voltage of winding 34 to energization of load portion 16 by voltage source 11 is effected upon each occurrence of saturation of core means 12. Since the same number of ampere-turns are supplied to the core during each of these modes of operation, the output which appears at the terminals 66 and 68 is proportional to the current in bus 32.

If the uniderectional current in bus 32 had the opposite polarity—flowing into the dot marked terminal of bus 32—the arrangement would operate in a similar manner except the transistor switch means 20 and 22 would assume the opposite operating conditions.

For example, for such a polarity of current in bus 32, positive ampere-turns will be supplied thereby to core means 12 and transistor switch means 20 will be alternately actuated between its conducting and nonconducting conditions; the current path established by diode 82 to allow load portion 16 to be energized from the voltage induced in winding 36 also operating to reverse bias transistor 22 to prevent the voltage applied thereto from winding 42 being able to turn such transistor on.

Thus, load portion 16 will be energized by current flowing from terminal 47 of winding 36, collector-base electrodes of transistor 22 (biasing such transistor off), diode 82, voltage source 11 and through load portion 16 in a direction to make junction 63 positive with respect to terminal 62. When positive saturation is reached however, transistor switch means 20 switches on to cause portion 15 to be energized from voltage source 11 in a direction to make junction 63 negative with respect to terminal 61. For example, current flows from terminal 60 of voltage source 11, through the emitter-collector circuit of transistor 20, winding 34 and through load portion 15 in a direction to make terminal 61 positive with respect to junction 63.

Accordingly, for such a polarity of the current to be transformed—current flow into the dot marked terminal of bus 32—output terminal 66 will be positive with respect to output terminal 68. Since this is the reverse of the polarities of such terminals for current to be transformed having the opposite polarity, the polarity at output terminals 66 and 68 provides a clear and unambiguous indication of the polarity of the current to be transformed.

Figure 3:
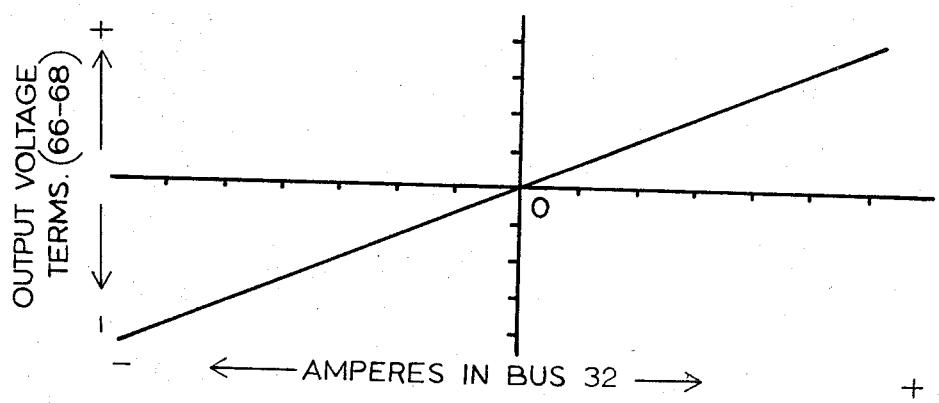
FIG. 3 is a curve showing the output of the circuit arragement of FIG. 1 as a function of the unidirectional current to be transformed.

This characteristic of the unidirectional current transforming arrangement of this invention is shown in FIG. 3, which is a curve showing the output voltage at output terminals 66–68 as a function of current in bus 32. As shown, as current is increased in bus 32 in the positive direction the output voltage also increases in the positive direction. Similarly, as current is increased in the negative direction in bus 32 the output voltage also increases in the negative direction. From FIG. 3, therefore, it can be seen that the output at terminals 66–68 will positively reflect a change in the polarity of the current to be transformed. As indicated, there are great many applications where it is not only desirable, but sometimes required, to obtain a clear indication that the polarity of the current being sensed has reversed.

There has been described herein a new and improved unidirectional current transforming arrangement which is capable of transforming (or sensing etc.), a unidirectional current of either polarity; which has complete electrical isolation from such unidirectional current, and wherein the output of such arrangement is not only proportional to the magnitude of the current to be transformed but such output also provides an indication of the polarity. Moreover, any change in such polarity of the current to be transformed is positively indicated. Further, when the current to be transformed is zero the arrangement can readily be made to provide a true zero output.

It therefore becomes apparent from the foregoing description and drawing that the invention, a bi-polar unidirectional current transforming arrangement, is a most useful and practical arrangement having many applications in the fields of electricity and electronics broadly, and the areas of sensing, measuring and transforming unidirectional currents in particular. The utility if the arrangement is enhanced by its adaptability to control circuits and systems already constructed, its compactness and unambiguous output characteristic, as well as, economy of construction.

While a specific embodiment has been shown herein, it will be apparent that this has been intended only as illustrative of the principles of the present invention. Other variations, an modifications within the true spirit and scope of the invention will doubtless occur to those skilled in the art to which the invention pertains and the appended claims are intended to cover all such variations and modifications.

What I claim as new and desire to secure by Letters Patent of the United States is:

1. A unidirectional current transforming arrangement comprising:
   (a) A source of unidirectional voltage;
   (b) Load means having first and second equal portions;
   (c) Magnetic core means having first and second windings disposed thereon in inductive relation relative to each other, said magnetic core means being adapted to be inductively coupled with a unidirectional current to be transformed, opposite polarities of such current being effective to supply opposite sense magnetomotive forces to said magnetic core means;
   (d) Means connecting said first winding and the first portion of said load means in series circuit relationship to establish a first electrical path and said second winding and second portion of said load means in series circuit relationship to establish a second electrical path;
   (e) Means including first and second asymmetrically conducting devices connecting said first electrical path for energization from the voltage induced in said first winding as a result of the magnetomotive force supplied to said magnetic core means by one polarity of said unidirectional current and connecting said second path for energization from the voltage induced in said second winding as a result of the magnetomotive force supplied to said magnetic core means by the reverse polarity of said unidirectional current;
   (f) Control means operative for a given polarity of the inductively coupled unidirectional current to be transformed to cause energization of said second electrical path from said unidirectional voltage source until opposite sense flux change occurs in said core, the alternate energized conditions of said first and second electrical paths being determined by the period between opposite sense flux changes in said core; and (g) Means for extracting an output across said load means which output is proportional to the magnitude of the unidirectional current inductively coupled to said core.

2. The unidirectional current transforming arrangement recited in claim 1 including first and second transistor switch means one of said switch means and one of said asymmetrically conducting devices being connected in each of said electrical paths, said asymmetrically conducting devices being arranged so that for a given polarity of the unidirectional current to be transformed one of said devices becomes effective to establish a current path so that the electrical path with which it is connected can be energized from the voltage induced in the winding of such path while at the same time said device is effective to cause the transistor switch means of that electrical path to be maintained nonconducting.

3. The unidirectional current transforming arrangement recited in claim 2 wherein said control means includes third and fourth windings inductively disposed on said core and in inductive relation relative to each other and to said first and second windings, said third and fourth windings being operative to apply voltages induced therein to each of said transistor switch means with polarities tending to establish opposing operating conditions for said transistor switch means.

4. The unidirectional current transforming arrangement recited in claim 3 wherein said first and second asymmetrically conducting devices are semiconductor diode devices connected so that current therethrough is operative to reverse bias the transistor switch means connected in the same electrical path therewith.

5. A unidirectional current transforming arrangement comprising:
(a) A source of unidirectional voltage;
(b) Load means having first and second equal portions;
(c) First and second semiconductor devices each having a base electrode, an emitter electrode and a collector electrode;
(d) Magnetic core means having first, second, third, and fourth windings thereon in inductive relation relative to each other, said magnetic core means being adapted to be inductively coupled with a unidirectional current to be transformed so that one polarity of such current supplies a second reverse direction magnetomotive force to said core;
(e) A first electrical path comprising the series combination of said first winding, the emitter-collector electrodes of said first semiconductor device and said first portion of said load means and a second electrical path including the series combination of said second winding, the emitter-collector electrodes of said second semiconductor device and said second portion of said load means, said unidirectional voltage source being connected between said emitter electrodes and the junction between the first and second portions of said load means;
(f) Control means including said third and fourth windings operative to apply voltages induced therein to each of said semiconductor devices with polarities tending to establishing opposing operating conditions for said semiconductor devices;
(g) First and second asymmetrically conducting devices one connected in each of said electrical paths, one of said devices being effective for one polarity of the unidirectional current to be transformed—and the other of said devices being similarly effective for the other polarity of such unidirectional current— to establish a current path to allow the electrical path with which it is connected to be energized from the voltage induced in the windings of that path by such unidirectional current to be transformed which current path is also effective to reverse-bias the semiconductor device connected in that path and prevent its being rendered conductive by the voltage applied by said control means, said control means being responsive to opposite sense flux saturations in said core to cause said other semiconductor device to be transferred between conducting and nonconducting conditions so that when said device is rendered conducting the electrical path associated therewith is energized from said unidirectional voltage source and current flows in the winding of such electrical path to supply a magnetomotive force to said core which is equal and opposite that supplied by the unidirectional current to be transformed; and
(h) Means for extracting an output across said load means which output is proportional to the magnitude of the unidirectional current to be transformed.

6. The unidirectional current transforming arrangement recited in claim 5 wherein said first and second asymmetrically conducting devices are semiconductor diode devices connected between a pair of electrodes of said semiconductor devices.

7. The unidirectional current transforming arrangement recited in calim 6 wherein said semiconductor diode devices are connected between the base and emitter electrodes of the respective semiconductor devices.

8. The unidirectional current transforming arrangement recited in claim 6 wherein said semiconductor diode devices are connected between the emitter and collector electrodes of the respective semiconductor devices.

9. A unidirectional current transformer circuit arrangement comprising:
(a) A magnetic circuit adapted to be magnetically coupled with a unidirectional current to be transformed, one polarity of said current producing a first direction flux change in said magnetic circuit and the reverse polarity of said current producing the opposite direction flux change therein;
(b) First and second windings on said magnetic circuit in inductive relation relative to each other;
(c) A unidirectional voltage source;
(d) Load means having first and second equal portions, said first portion being equal connected in series circuit with said first winding and said second portion being connected in series circuit with said second winding;
(e) Means establishing a first current path to allow said first portion of said load means to be energized from the voltage induced in said first winding by flux change in said first direction;
(f) Means establishing a second current path to allow said second portion of said load means to be energized from the voltage induced in said second winding by flux change in said opposite direction;
(g) Means responsive to a predetermined magnitude of flux change in said magnetic circuit in said first direction as a result of the coupling thereto of said unidirectional current of one polarity for connecting said second winding and second portion of said load means in series circuit with said voltage source to supply an equal and opposite flux change in said magnetic circuit, said means being similarly responsive to a predetermined magnitude of flux change in said magnetic circuit in said opposite direction as a result of the coupling thereto of said unidirectional current of reverse polarity for connecting said first winding and first portion of said load means in series circuit with said voltage source to supply an equal and opposite flux change in said magnetic circuit so that transfer of energization from one portion of said load means to the other is effected upon each occurrence of the predetermined magnitude of flux change in said magnetic circuit; and
(h) Means for extracting an output across said load means, said output being proportional to the magnitude of the unidirectional current which was magnetically coupled to said magnetic circuit.

10. The unidirectional current transformer circuit arrangement recited in claim 9 wherein said magnetic circuit comprises a saturable magnetic core means and wherein transfer of energization from one portion of said load means to the other takes place upon each occurrence of saturation in said core.

11. The unidirectional current transformer circuit arrangement recited in claim 10 including first and second transistor devices one connected in series circuit with a portion of said load means and the winding associated therewith and said means responsive to saturation of said core means includes third and fourth windings in inductive relation relative to each other and to said first and second windings and being operative to apply voltages opposite conducting conditions therefore, and wherein said means establishing said first current path also functions to keep the transistor associated with said first portion of said load means nonconducting and said means establishing said second current path also functions to keep the transistor associated with said second portion of said load means nonconducting.

12. The unidirectional current transformer arrangement recited in claim 11 wherein said means establishing said first current path is a semiconductor diode connected between a pair of electrodes of said first transistor and said means establishing said second current path is a semiconductor diode connected between a pair of electrodes of said second transistor.

References Cited

UNITED STATES PATENTS

| | | | |
|---|---|---|---|
| 3,135,911 | 6/1964 | Van Allen | 323—89 |
| 3,396,338 | 8/1968 | Buchanan et al. | 324—117 |
| 3,430,142 | 2/1969 | Covert | 324—127 X |

J D MILLER, Primary Examiner

G. GOLDBERG, Assistant Examiner

U.S. Cl. X.R.

323—56, 89; 324—117, 127